(12) United States Patent
Brooks

(10) Patent No.: US 12,317,163 B2
(45) Date of Patent: May 27, 2025

(54) PROVIDING ADDITIONAL INFORMATION FOR EMERGENCY ALERTS VIA WIRELESS NETWORKS

(71) Applicant: T-Mobile USA, Inc., Bellevue, WA (US)

(72) Inventor: Terri Leigh Brooks, Prosper, TX (US)

(73) Assignee: T-Mobile USA, Inc., Bellevue, WA (US)

( * ) Notice: Subject to any disclaimer, the term of this patent is extended or adjusted under 35 U.S.C. 154(b) by 406 days.

(21) Appl. No.: 17/840,245

(22) Filed: Jun. 14, 2022

(65) Prior Publication Data

US 2023/0403544 A1 Dec. 14, 2023

(51) Int. Cl.
*H04W 4/90* (2018.01)
*H04W 4/029* (2018.01)
*H04W 4/80* (2018.01)

(52) U.S. Cl.
CPC ............. *H04W 4/80* (2018.02); *H04W 4/029* (2018.02)

(58) Field of Classification Search
CPC ....... H04W 4/90; H04W 76/50; H04W 68/00; H04W 4/029; H04W 4/02; H04W 4/021; H04W 4/38; H04W 4/027; H04W 8/24; H04W 4/023; H04W 4/08; H04W 64/00; H04W 4/026; H04W 4/20; H04W 4/48; H04W 4/80; H04W 52/0277; H04W 64/003; H04W 4/12; H04W 8/245; H04W 88/02; H04W 4/024; H04W 4/33; H04M 2242/30; H04M 2242/04; H04M 3/5116; H04M 3/42348; H04M 3/5232; H04M 1/72418; H04M 1/72424; H04M 1/72445; H04M 2207/18; H04M 3/00;
(Continued)

(56) References Cited

U.S. PATENT DOCUMENTS 6,509,833 B2 1/2003 Tate
6,745,021 B1 6/2004 Stevens
(Continued)

FOREIGN PATENT DOCUMENTS

CN 108632341 B 7/2021
EP 1679671 B1 2/2009
(Continued)

*Primary Examiner* — Quan M Hua
(74) *Attorney, Agent, or Firm* — Perkins Coie LLP

(57) ABSTRACT

A method for providing targeted alerts by a telecommunications system includes receiving, by a server subsystem, an alert message from an alert originator system. The alert message indicates an emergency associated with an area. The method includes passing the alert message to multiple mobile devices. The method also includes receiving a request message at a lookup subsystem of the telecommunications system generated by an instance of a mobile application on a mobile device based on the alert message. The method includes performing a lookup at a database for additional information associated with the alert message. The additional information identifies the geographic area associated with the emergency. The method further includes communicating the additional information to the particular mobile device thereby enabling the instance of the mobile application to perform an action related to the alert message to a user of the particular mobile device.

17 Claims, 4 Drawing Sheets

(58) Field of Classification Search
CPC ......... H04M 1/72412; H04M 1/72436; H04M 1/67; H04M 1/72403; H04M 1/72463; H04M 1/724631; H04M 2203/2094; H04M 2242/15; H04M 1/72421; H04M 1/72457; H04M 1/72469

See application file for complete search history.

(56) References Cited

U.S. PATENT DOCUMENTS

| | | | |
|---|---|---|---|
| 6,909,903 | B2 | 6/2005 | Wang |
| 6,952,181 | B2 | 10/2005 | Karr et al. |
| 7,054,612 | B2 | 5/2006 | Patel |
| 7,444,137 | B1 | 10/2008 | Mcnamara et al. |
| 7,558,558 | B2 | 7/2009 | Langsenkamp et al. |
| 7,719,414 | B1 | 5/2010 | Smith et al. |
| 7,747,239 | B1 | 6/2010 | Sennett et al. |
| 7,933,581 | B2 | 4/2011 | Wijayanathan et al. |
| 7,983,654 | B2 | 7/2011 | Shelton et al. |
| 8,010,164 | B1 | 8/2011 | Sennett et al. |
| 8,095,610 | B2 | 1/2012 | Gould et al. |
| 8,126,479 | B2 | 2/2012 | Morrison |
| 8,126,480 | B2 | 2/2012 | Morrison |
| 8,155,671 | B2 | 4/2012 | Wood et al. |
| 8,219,110 | B1 | 7/2012 | White et al. |
| 8,301,112 | B2 | 10/2012 | Morrison |
| 8,350,721 | B2 | 1/2013 | Carr |
| 8,457,612 | B1 | 6/2013 | Daniell |
| 8,467,795 | B2 | 6/2013 | Li et al. |
| 8,478,225 | B2 | 7/2013 | Sennett et al. |
| 8,490,129 | B2 | 7/2013 | Phillips et al. |
| 8,565,713 | B2 | 10/2013 | Sennett et al. |
| 8,639,212 | B1* | 1/2014 | Sennett ................ H04W 16/26 455/457 |
| 8,688,071 | B1 | 4/2014 | Daly et al. |
| 8,731,513 | B2 | 5/2014 | Lemberg et al. |
| 8,768,291 | B2 | 7/2014 | Williams et al. |
| 8,826,327 | B2 | 9/2014 | Adimatyam et al. |
| 8,918,075 | B2 | 12/2014 | Maier et al. |
| 8,995,950 | B2 | 3/2015 | Williams et al. |
| 9,094,816 | B2 | 7/2015 | Maier et al. |
| 9,374,698 | B2 | 6/2016 | Ahmed et al. |
| 9,635,534 | B2 | 4/2017 | Maier et al. |
| 9,654,953 | B2 | 5/2017 | Bontu et al. |
| 9,706,263 | B2 | 7/2017 | Alman et al. |
| 10,171,980 | B2 | 1/2019 | Friesen |
| 2007/0112511 | A1 | 5/2007 | Burfeind et al. |
| 2007/0265006 | A1 | 11/2007 | Washok et al. |
| 2008/0057919 | A1 | 3/2008 | Choi-grogan et al. |
| 2008/0064363 | A1* | 3/2008 | Salafia .............. H04M 3/42068 379/88.13 |
| 2008/0070546 | A1* | 3/2008 | Lee ...................... G08B 25/016 455/457 |
| 2009/0137222 | A1 | 5/2009 | Heen |
| 2009/0247111 | A1 | 10/2009 | Sennett et al. |
| 2009/0247116 | A1* | 10/2009 | Sennett .................. H04W 4/90 455/404.2 |
| 2009/0291630 | A1 | 11/2009 | Dunn et al. |
| 2010/0195805 | A1* | 8/2010 | Zeigler ................ H04M 3/5116 379/45 |
| 2012/0190295 | A1* | 7/2012 | Kim ...................... G06Q 50/26 455/3.01 |
| 2015/0334545 | A1* | 11/2015 | Maier .................. H04W 64/00 455/404.2 |
| 2021/0143897 | A1 | 5/2021 | Edge |
| 2021/0212158 | A1 | 7/2021 | Robertson et al. |
| 2021/0352438 | A1 | 11/2021 | Ford et al. |
| 2022/0070608 | A1 | 3/2022 | Brooks et al. |

FOREIGN PATENT DOCUMENTS

| | | |
|---|---|---|
| EP | 2001253 B1 | 5/2013 |
| EP | 2909806 A1 | 8/2015 |
| EP | 3400728 B1 | 3/2021 |
| KR | 20050089406 A | 9/2005 |
| KR | 20060133275 A | 12/2006 |
| KR | 20170034542 A | 3/2017 |
| KR | 102339144 B1 | 12/2021 |
| WO | 2005053336 A2 | 6/2005 |
| WO | 2012048383 A1 | 4/2012 |
| WO | 2013095287 A1 | 6/2013 |
| WO | 2014009212 A1 | 1/2014 |
| WO | 2014013275 A2 | 1/2014 |
| WO | 2014204378 A1 | 12/2014 |
| WO | 2015030897 A1 | 3/2015 |
| WO | 2017218490 A1 | 12/2017 |
| WO | 2019158443 A1 | 8/2019 |
| WO | 2019167082 A1 | 9/2019 |
| WO | 2020128435 A1 | 6/2020 |
| WO | 2020128455 A2 | 6/2020 |
| WO | 2020181337 A1 | 9/2020 |

\* cited by examiner

PROVIDING ADDITIONAL INFORMATION FOR EMERGENCY ALERTS VIA WIRELESS NETWORKS

BACKGROUND

Wireless Emergency Alerts (WEAs) are short emergency messages generated and distributed by federal, state, or local alerting authorities. The WEAs can alert the public about natural or man-made threats (e.g., hurricanes, floods, wildfires, industrial disasters, pandemics, terrorist attacks, or child abductions). The WEAs are configured to be distributed at a targeted geographical area associated with an emergency. For example, the WEAs are broadcasted via designated cell sites of a wireless network to all mobile devices located within the targeted geographical area. The WEAs can include text notifications providing a brief description of an emergency including the location and type of the emergency.

Because wireless signals cannot be stopped at geographical borders, a certain portion of the broadcast messages is received by mobile devices that are located outside the particular geographical area associated with the emergency. Such overshooting of the WEAs generates a challenge for broadcasting the alert messages. The reception of overshot WEAs can cause unnecessary concern or stress to individuals receiving them. The reception of the overshot WEAs can also lead to frustration toward the emergency alert system and cause individuals to ignore the received WEAs or opt-out of receiving them.

BRIEF DESCRIPTION OF THE DRAWINGS

Detailed descriptions of implementations of the present invention will be described and explained through the use of the accompanying drawings.

Figure 1:
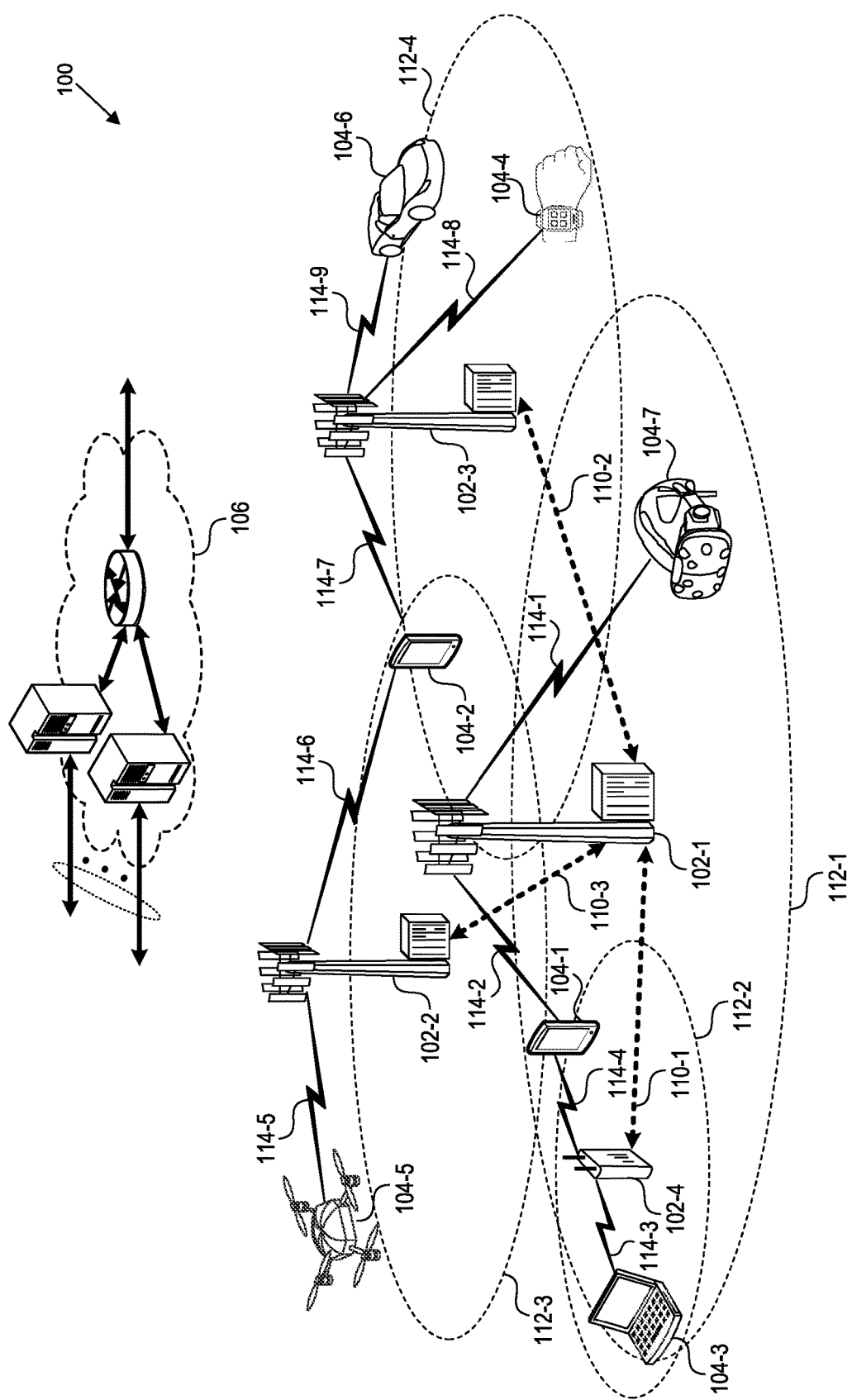
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology relates to providing emergency alerts (e.g., an emergency alert message or an alert message) to users of mobile devices in a wireless telecommunications network. An emergency alert is received from an alert originator's system (e.g., the Federal Emergency Management Agency (FEMA)), which then distributes any alerts intended for the Wireless Emergency Alert system to the Cellular Mobile Service Providers (CMSPs)). The emergency alert indicates an emergency that is affecting a geographical area that is defined by, for example, geocode boundaries (e.g., the boundaries of a city, country, or state). In particular, the technology is directed to preventing presentations, or compensating for the presentations, of overshooting emergency alerts that are received by mobile devices located outside a geographical area designated for receiving the emergency alert. The disclosed technology can be used for preventing the presentation of the emergency alert to a user of a mobile device when the mobile device is outside the geographical area associated with the emergency. The disclosed technology can be used for providing additional information related to the emergency alert after presenting the emergency alert. The additional information can include an indication that the mobile device is located outside the geographical area associated with the emergency and, as such, previously presented emergency alert was irrelevant to the mobile device. The additional information can also include updates related to the emergency, such as an indication that the emergency ended.

In one example, a computer-implemented method for providing targeted alerts to subscribers of a wireless telecommunications network performed by a telecommunications system includes receiving an alert message from an alert originator system by a server subsystem of the telecommunications system. The alert message indicates an emergency associated with a geographic area. The alert message is configured to designate one or more cell sites of the wireless telecommunications network to receive the alert message. The method includes causing the one or more cell sites to pass (e.g., broadcast) the alert message to multiple mobile devices located within a network coverage area of the one or more cell sites. The network coverage area includes the geographical area associated with the emergency. The method also includes receiving, at a lookup subsystem of the telecommunications system, a request message generated by a particular instance of a mobile application on a particular mobile device of the multiple mobile devices. The request message is generated by the particular instance of the mobile application based on the alert message received by the particular mobile device. In response to receiving the request message, the method includes accessing (e.g., by token exchange or other database lookup method) additional information at a database associated with the alert message. The additional information identifies the geographic area associated with the emergency. The additional information can also identify, but is not limited to, more specifics about the geographical area associated with the emergency. The method further includes communicating the additional information to the particular mobile device thereby enabling the instance of the mobile application to perform an action related to the alert message. The action is performed based on whether the particular mobile device is located within the geographic area associated with the emergency.

In another example, a mobile device is in communication with a telecommunications system. The mobile device receives an alert message from a server subsystem of the telecommunications system via one or more cell sites associated with the telecommunication systems. The alert message indicates an emergency associated with a geographic area. The alert message also designates the one or more cell sites associated with the telecommunications system to pass the alert message to multiple mobile devices located within a network coverage area of the one or more cell sites. The network coverage area includes the geographical area associated with the emergency. The mobile device generates a request message based on the alert message received by the mobile device. The mobile device then transmits the request message to a lookup subsystem of the telecommunications system. In response to receiving the request message, the mobile device causes the lookup subsystem to perform a lookup at a database for additional information associated with the alert message. The additional information identifies the geographic area associated with the emergency. The mobile device receives the additional information from the lookup subsystem and performs an action related to the alert message based on whether the mobile device is located within the geographic area associated with the emergency from the lookup subsystem.

In yet another example, a method performed by a mobile device in communication with a telecommunications system includes receiving an alert message from a first subsystem of the telecommunications system. The alert message indicates an occurrence associated with a geographic area. The alert message designates one or more cell sites associated with the telecommunications system to pass the alert message to multiple mobile devices located within a network coverage area of the one or more cell sites. The network coverage area includes the geographical area. The method includes transmitting a request message to a second subsystem of the telecommunications system to obtain additional information associated with the alert message from a database. The method also includes receiving the additional information from the second subsystem of the telecommunications system and performing an action related to the alert message based on whether the mobile device is located within the geographic area associated with the occurrence.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (VVWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (ARNR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

Systems and Methods for Providing Targeted Alerts

Figure 2:
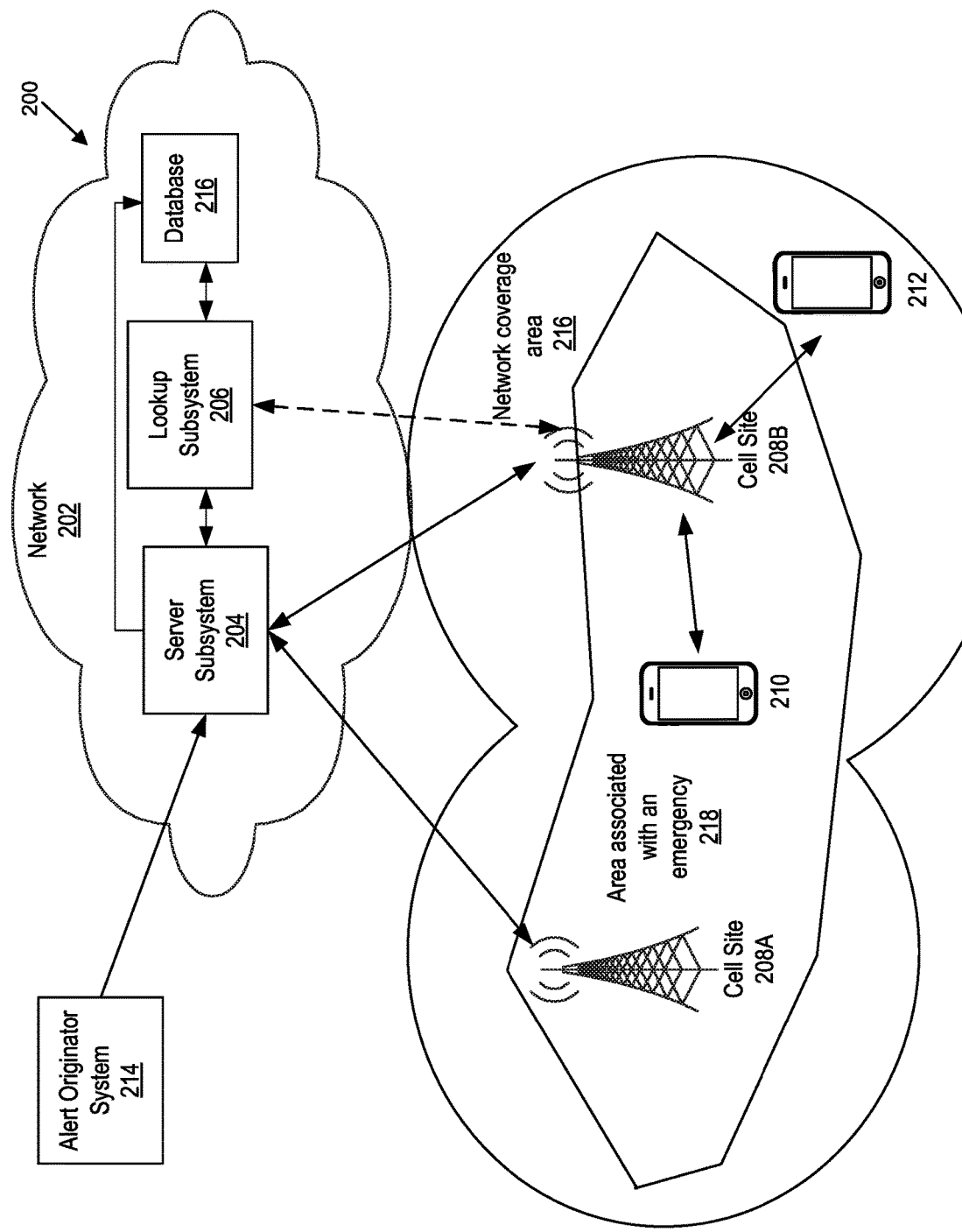
FIG. 2 is a system diagram that illustrates a telecommunications system in communications with mobile devices for distributing emergency alerts.

FIG. 2 is a system diagram that illustrates a telecommunications system 200 in communications with mobile devices for distributing emergency alerts. The telecommunications system 200 includes a server subsystem 204 and a lookup subsystem 206 that are in communication with each other by a wireless network 202. The telecommunications system 200 further includes, or is in communications with, a plurality of network cell sites (e.g., network cell sites 208A and 208B referred to collectively as "cell sites 208"). The telecommunications system 200 is in communication with mobile devices (e.g., mobile devices 210 and 212) by being communicatively coupled to the network 202 via the cell sites 208. In some implementations, the mobile devices 210 and 212 are associated with subscribers of the wireless network 202. The telecommunications system 200 can also communicate with an alert originator system 214. For example, the telecommunications system 200 can be configured to receive alert messages (e.g., WEAs) from the alert originator system 214 and pass them to the mobile devices 210 and 212 via the cell sites 208.

The mobile devices 210 and 212 (e.g., electronic devices) are any type of mobile devices that can communicate with a network node and/or with another electronic device in a cellular, computer, and/or mobile communications system. Examples of such mobile devices include smartphones, tablet computers, laptop computers, wireless devices capable of machine-to-machine (M2M) communication, wearable electronic devices, movable Internet of Things devices (IoT devices), and any other handheld device that is capable of accessing the network(s) 100. Although only two mobile devices are illustrated in FIG. 2, the disclosed implementations can include any number of mobile devices.

The mobile devices 210 and 212 can include a mobile application that is associated with the communications system 200. In some implementations, the mobile application is configured to activate in response to receiving an alert message from the server subsystem 204. The mobile application can enable communications between the mobile devices 210 and 212 and the server subsystem 204. Optionally, the mobile application can enable communications between the mobile devices 210 and 212 and the lookup subsystem 206 (e.g., the mobile devices 210 and 212 can receive data from the lookup subsystem 206). For example, a respective instance of a mobile application (e.g., a single copy of the mobile application software) operating on the mobile device 210 or 212 can receive an alert message from the server subsystem 204. Upon receiving the alert message, the respective instance of the mobile application activates and performs an action based on the received alert message related to the alert message. The action can include, for example, presenting the alert message to the user, presenting additional information related to the emergency to the user, or blocking the alert message from being presented to the user. The type of action performed by the respective instance of the mobile application can be based on whether the mobile device is located inside or outside of the area that has been designated to receive the alert message.

The mobile devices 210 and 212 can store and transmit (e.g., internally and/or with other mobile devices over a network) signals, code (composed of software instructions), or data by using machine-readable media, such as non-transitory machine-readable media (e.g., machine-readable storage media such as magnetic disks, optical disks, read-only memory (ROM), flash memory devices, and phase change memory) and transitory machine-readable transmission media (e.g., electrical, optical, acoustical, or other forms of propagated signals, such as carrier waves or infrared signals).

The mobile devices 210 and 212 can include hardware such as one or more processors coupled to sensors and a non-transitory machine-readable media to store code and/or sensor data, user input/output (I/O) devices (e.g., a keyboard, a touchscreen, and/or a display), and network connections (e.g., an antenna) to transmit code and/or data using propagating signals. The coupling of the processor(s) and other components is typically through one or more busses and bridges (also referred to as bus controllers). Thus, a non-transitory machine-readable medium of a given electronic device typically stores instructions for execution on a processor(s) of that electronic device. One or more parts of an implementation of the present technology can be implemented using different combinations of software, firmware, and/or hardware.

In some implementations, the mobile devices 210 and 212 include technology for determining and tracking the geographical locations of the mobile devices 210 and 212. The technology can include Global Positioning System (GPS) trackers for determining the location based on cell identification and respective signal strengths. The location of the mobile devices 210 and 212 can also be determined based on Wi-Fi networks that the mobile devices can receive. In some implementations, the mobile devices 210 and 212 also include technology for providing information to the users of the devices. Such technology can include a display and/or a speaker. Providing information can include presenting visual messages such as images or text displayed on a display of a respective mobile device. For example, presenting the visual information can include displaying a text message or a map on a display. Providing information can also include providing audio messages such as voice alerts or voice commands via a speaker of a respective mobile device.

The cell sites 208 can be cellular-enabled mobile device sites including antennas and electronic communications equipment operating as cellular base stations in a network. The electronic communications equipment can include a radio mast, a radio tower, or other raised structures. The electronic communications equipment can further include transceivers, digital signal processors, control electronics, GPS receivers, and/or electrical power sources. The cell sites 208 can communicate with mobile devices (e.g., the mobile devices 210 and 212) and/or with other cell sites within their respective coverage areas (e.g., "cells") by radio waves. The cell sites 208 can provide the mobile devices access to server systems of the network 202. The mobile devices within the respective coverage areas communicate with the telecommunication system 200 through the cell sites using separate frequency channels assigned by the cell site from a common pool of frequencies. For example, the cell sites 208 have a combined network coverage area 216. The cell sites 208 can communicate with mobile devices located within the coverage area 216. As shown, in FIG. 2 the mobile devices 210 and 212 are located within the coverage area 216 and thereby communicate with the telecommunications system 200 via the cell sites 208.

The network(s) 202 can include any combination of private, public, wired, or wireless systems such as a cellular network, a computer network, the Internet, and the like. Any data communicated over the network(s) 202 can be encrypted or unencrypted at various locations or along different portions of the networks. Examples of wireless systems include Wideband Code Division Multiple Access (WCDMA), High Speed Packet Access (HSPA), Wi-Fi, Wireless Local Area Network (WLAN), Global System for Mobile Communications (GSM), GSM Enhanced Data Rates for Global Evolution (EDGE) Radio Access Network (GERAN), 4G or 5G wireless wide area networks (VVWAN), and other systems that can also benefit from exploiting the scope of this disclosure.

The telecommunications system 200 can include multiple subsystems, including the server subsystem 204 (e.g., a routing subsystem or a managing subsystem) and the lookup subsystem 206. The server subsystem 204 and the lookup subsystem 206 can include any number of server computers communicatively coupled with each other via the network 202.

The server subsystem 204 and the lookup subsystem 206 can include combinations of hardware and/or software to process data, perform functions, communicate over the network(s) 202, etc. For example, each of the computers of the server subsystem 204 and the lookup subsystem 206 can include a processor, memory or storage, a transceiver, a display, operating system and application software, and the like. Other components, hardware, and/or software included in subsystems that are well known to persons skilled in the art are not shown or discussed herein for brevity.

As shown in FIG. 2, the server subsystem 204 is communicatively coupled to the mobile devices 210 and 212 via the cell sites 208 and to the alert originator system 214. The server subsystem 204 is configured to mediate a flow of data between the mobile devices 210 and 212 and the lookup subsystem 206. The server subsystem 204 can also mediate a flow of data from the alert originator system 214 to the lookup subsystem 206 and the mobile devices 210 and 212. Optionally, also the lookup subsystem 206 can be communicatively coupled to the mobile devices 210 and 212 via the cell sites 208 so that the lookup subsystem 206 can communicate with the mobile devices 210 and 212 directly.

In some implementations, the lookup subsystem 206 receives data generated and/or communicated by the alert originator system 214 and stores the data in a database. The lookup subsystem 206 can include, or be in communication with, a database 220 configured for storing the data generated and communicated by the alert originator system 214. The lookup subsystem 206 can facilitate searching and collecting the data stored in the database 220 based on a specified value. For example, the lookup subsystem 206 can search and collect data based on a digital token or other identifier code (e.g., a geocode associated with an emergency). The lookup subsystem 206 can perform such searches in response to requests received, for example, from the mobile devices 210 and 212. The database 220 can also store other data. For example, the database 220 can include data received from third parties that is associated with, or could be useful for, instances of emergencies.

Although in FIG. 2 the server subsystem 204, the lookup subsystem 206, and the database 220 are included in the network 202, the server subsystem 204, the lookup subsystem 206, or the database 220 can also be located elsewhere to implement the disclosed technology.

The alert originator system 214 is configured to generate and distribute alert messages (e.g., WEAs) to be broadcasted via wireless telecommunications systems to the public via their mobile devices. The alert originator system 214 can include an alert management system or agency (e.g., The Integrated Public Alert & Warning Systems (IPAWS) operated by FEMA). The alert originator system 214 can also include, or be associated with, multiple agencies having alert originator authority (e.g., alert originators). The alert originators can include, for example, local, state, and federal public safety agencies, the President, FEMA, and the National Weather service. The alert originators can be configured to generate alert messages and communicate the alert messages to the alert management system or agency (e.g., FEMA). The alert management system or agency of the alert originator system 214 is configured to process the alert messages received from the alert originators and facilitate the distribution of alert messages to alerting disseminators. The alerting disseminators include wireless network service providers (e.g., Commercial Mobile Alert Service (CMAS)) such as the telecommunications system 200. The alerting disseminators can also include other service providers such as internet services and emergency alert systems associated with radio and television.

As an example, the National Weather Service generates an alert message that indicates a tornado threat in a particular geographical area. The National Weather Service communicates the alert message to FEMA that processes and distributes (e.g., via (PAWS) the alert message to the telecommunications system 200, as well as other alert dissemination systems. The alert message is broadcast to mobile device users via cell sites (e.g., the cell sites 208) of the telecommunications system 200 having a network coverage area that includes the particular geographical area indicated for the tornado threat.

The alert messages can be associated with an emergency. The emergency can be associated with severe weather (e.g., hurricanes, tornadoes, blizzards, flash floods), natural disasters (e.g., tsunamis, earthquakes, volcanic eruptions, or wildfires), child abductions (e.g., Amber alert), missing adult instances (e.g., Blue, Silver, or Clear alert), homeland security threats (e.g., terrorist attacks), nationwide emergency (e.g., Presidential alerts), public health threats (e.g., pandemic associated alerts), shelter in place orders, or industrial disasters (e.g., chemical spills or explosions). In general, the emergencies associated with the alert messages cause such imminent threats to the public or to an individual that the authorities initiate broadcasting a widespread alert message to the public. Because the threats are imminent, it is very important to provide alert messages to the public fast. The alert message messages target a particular area associated with the emergency. The alert messages can include information related to the emergency such as the location and type of emergency. The information can further include instructions to the public on protective measures, information related to individuals involved with the emergency, or information on responsive authorities. In some implementations, the alert messages are associated with occurrences that do not necessarily include an emergency. For example, such alert messages can be used for distributing information to prevent emergencies or providing the public with other important information.

The alert message includes a designation for a geographical area. The geographical area includes the area where the emergency is occurring or is expected to occur. For example, when an imminent threat is occurring in a downtown area of a city, the authorities (e.g., an alert originator or an alert management system or agency) can designate the area of the whole city to be the geographical area associated with the emergency. In some implementations, the geographical area includes one or more states, one or more counties, one or more towns, one or more metropolitan areas, any combinations thereof, or any other area that can be defined based on predefined boundaries. In some implementations, the geographical area includes a polygonal area. For example, the polygonal area could define a portion of a highway, a train line, a subway line and a respective adjacent area, a waterbody (e.g., a river or a sea) and adjacent area, a particular building (e.g., a skyscraper, a transit center, or a government building). In some implementations, the geographical area includes two or more portions that are separate. For example, the geographical area includes distinct cities or distinct buildings (e.g., all schools within a school district).

In order to broadcast the alert message to the mobile devices within the geographical area associated with the emergency, the alert originator system 214 and/or the telecommunications system 200 are configured to designate one or more cell sites 208 for passing the alert message to the network coverage area of the one or more designated cell sites 208. In FIG. 2, the emergency is associated with the area 218. The area 218 associated with the emergency has a polygonal shape. The area 218 is located within the network coverage area 216 of the cell sites 208. The alert originator system 214 and/or the telecommunications system 200 can therefore designate the cell sites 208 to pass the alert message to all the mobile devices within the network coverage area 216. For example, the mobile device 210 that is located inside the boundaries of the area 218 associated with the emergency as well as the network coverage area 216 will receive the alert message.

In some implementations, a network coverage area of a base station is divided into multiple sectors. For example, a base station includes three or six antennas of a 120 or a 60 degrees opening for a network coverage, respectively, while a non-sector base station includes a single omni-directional antenna. Each sector can be considered as a cell site having its unique set of frequency channels. The alert originator system 214 and/or the telecommunications system 200 can be configured to designate one or more of the multiple sectors of the network coverage area to receive the alert message. For example, a respective cell site 208 includes multiple sets of equipment for broadcasting radio waves to different sectors and the alert originator system 214 and/or the telecommunications system 200 can designate less than all of the multiple sets of equipment to broadcast the alert message. As used herein, the terms "cell site" and "sector" can be used interchangeably.

Because the wireless radio waves cannot be stopped at the boundaries of geographical areas, passing the alert message to an entirety of the network coverage area 216 can cause a certain amount of overshooting of the alert messages. Overshooting of alert messages refers to passing the alert message to mobile devices that are outside of the area 218 associated with the emergency. For example, in FIG. 2 the mobile device 212 is outside the area 218 associated with the emergency but within the network coverage area of the designated cell sites 208. The mobile device 212 can therefore receive the alert message due to overshooting. Receiving an alert message due to overshooting can cause unnecessary stress or frustration in the users receiving such messages. The overshooting can also cause an unnecessary burden on emergency services or the network 202. For example, the users who received the overshot alert messages can seek help by calling 911, seek shelter in place at public buildings, or just simply initiate text messaging or phone call to family members. All such actions can overburden the emergency services and/or the network thereby slowing down or preventing users under actual imminent threat from receiving help.

In some implementations, the alert originator system 214 is configured to generate an alert message that is associated with an area 218 and send it to the alert message to the server subsystem 204. In accordance with the designation, the server subsystem 204 is configured to forward the alert message to the cell sites 208 that pass the alert message to the mobile devices within their joined network coverage area 216. In some implementations, the server subsystem 204 can be configured to pass the alert message, together with any information related to the alert message, to the lookup subsystem 206. The lookup subsystem 206 is configured to store the information in the database 220. In some implementations, the server subsystem 204 is configured to send the information associated with the alert message to the database 220 directly.

The alert message is configured to identify the geographical area 218 associated with the emergency. The alert originator system 214 and/or the server subsystem 204 designate the cell sites 208A and 208B to pass the alert message to the mobile devices, based on the overlap between the area 218 and the network coverage area 216. The alert message can include some sort of identifier or a code that associated the alert message to the emergency. In some implementations, the alert message can include a geocode. A geocode refers to a code that identifies a geographical area that is associated with the emergency. The geocode can identify the geographical area by a name (e.g., a name of a city or a country), a zip code, or by a combination of addresses. In some implementations, the geocode is selected from a database of geocodes (e.g., a public or private database that is accessible by the alert originator system 214 and/or the system 200). The database of geocodes can include mapping of each of the geocodes to a specific cell site or a sector associated with a specific cell site. In some implementations, the alert message includes a digital token. A digital token includes an identifier or a code that can be used to seek and provide information related to a particular emergency. In some implementations, the alert message does not include global coordinates that identify the geographical area associated with the emergency.

Figure 3:
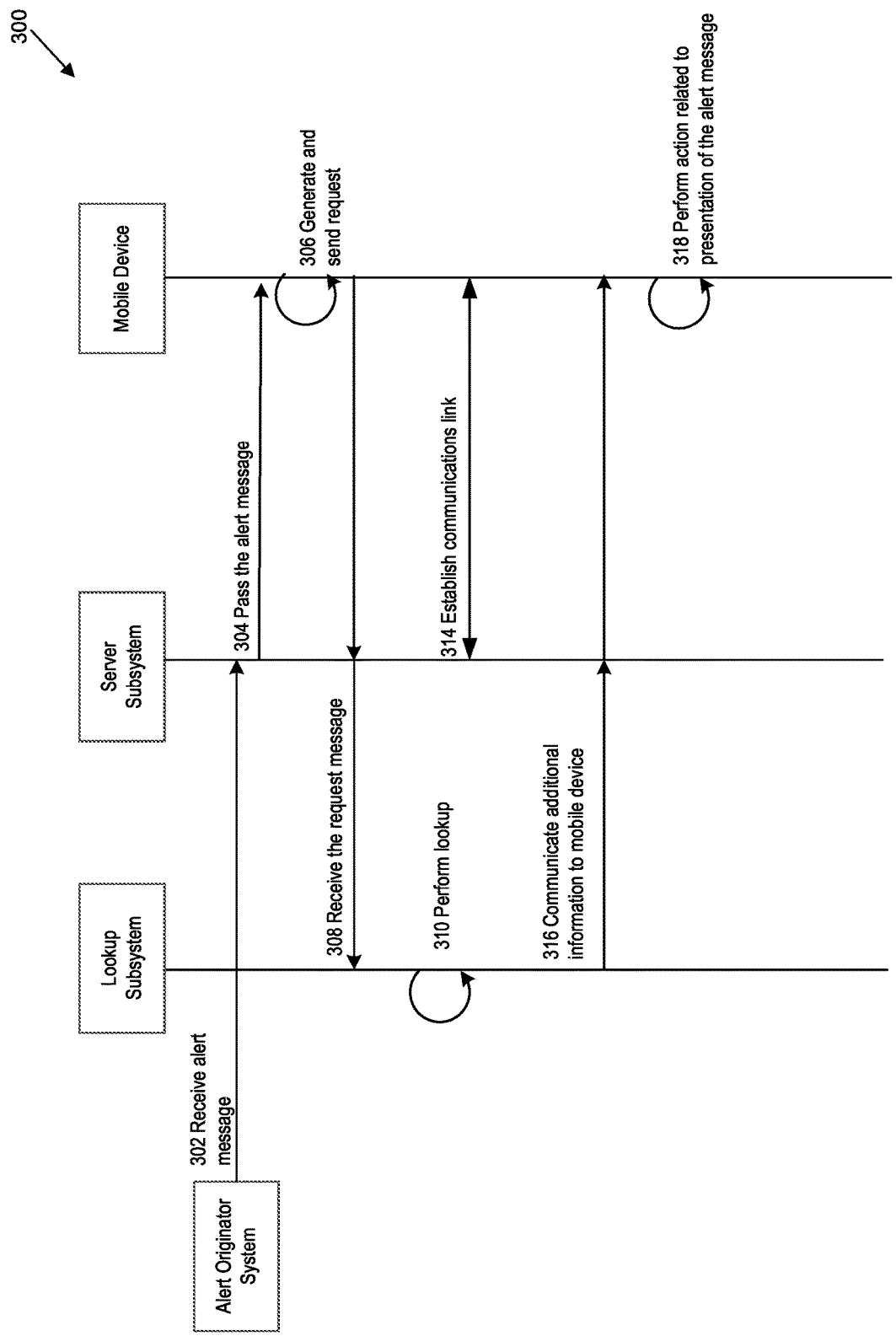
FIG. 3 is a flowchart that illustrates processes of providing alert messages to users of a wireless network by telecommunication systems.

FIG. 3 is a flowchart that illustrates processes 300 of providing alert messages to users of a wireless network by telecommunication systems. The processes 300 can be performed by a telecommunications system (e.g., the telecommunications system 200 including the server subsystem 204 and the lookup subsystem 206 in FIG. 2) in communications with mobile devices (e.g., mobile devices 210 and 212) and an alert originator system (e.g., the alert originator system 214). The server subsystem, the lookup subsystem, and the mobile devices can each include at least one hardware processor and at least one non-transitory memory storing instructions. For example, the server subsystem, the lookup subsystem, and the mobile devices correspond to a computer system 400 described with respect to FIG. 4. When the instructions are executed by the at least one hardware processor, the server subsystem, the lookup subsystem, and the mobile devices can perform the processes 300.

At 302, the server subsystem (e.g., a first subsystem) of the telecommunications system receives an alert message from an alert originator system. The alert message indicates an emergency associated with a geographic area (e.g., the area 218 in FIG. 2). In some implementations, the geographic area associated with the emergency is defined as a state, a county, a city, or a polygonal region defined by the alert originator system. The polygonal area can include a portion of a highway, a train line, a subway line, and a respective adjacent area, a waterbody (e.g., a river or a sea) and an adjacent area, or a particular building (e.g., a skyscraper, a transit center, or a government building). The geographic area can be a single continuous or discontinuous area including two separate portions. For example, the geographic area can include two cities within a state that are located away from each other. In some implementations, the alert message does not include global coordinates defining the geographical area associated with the emergency. Instead, the geographical area is identified based on a zip code, a name, or a combination of addresses.

The alert message is configured to designate the one or more cell sites of the wireless telecommunications network to receive the alert message. At 304, the one or more cell sites pass the alert message to multiple mobile devices located within a network coverage area of the one or more cell sites. The network coverage area includes the geographical area associated with the emergency. For example, the server subsystem 204 forwards the alert message received from the alert originator system 214 to the cell sites 208 of FIG. 2. The cell sites 208 pass the alert message to all mobile devices located within network coverage area 216 that are configured to receive alert messages. These mobile devices include, for example, the mobile devices 210 and 212.

Cell sites of the telecommunications system have predefined locations and network coverage areas. The one or more cell sites are designated based on their respective network coverage areas. The designated one or more cell sites have a network coverage area that includes the geographic area associated with the emergency so that the alert message can be passed by the designated cell sites to the geographic area associated with the emergency. For example, in FIG. 2 the network coverage area 216 of the cell sites 208 overlaps with and includes the area 218 associated with the emergency. The alert message can therefore designate the cell sites 208 to receive the alert message associated with the emergency.

The network coverage area of the one or more cell sites can be larger than the geographical area associated with the emergency. As shown in FIG. 2, the area 218 associated with the emergency is located within the boundaries of the network coverage area 216. Passing the alert message to the multiple mobile devices located within the network coverage area of the one or more cell sites can cause overshooting of the alert message to one or more mobile devices located outside the geographical area associated with the emergency and within the network coverage area of the one or more cell sites. For example, the mobile device 212 in FIG. 2 located within the network coverage area 216 receives the alert message even though it is located outside the area 218 associated with the emergency.

In some implementations, in response to receiving the alert message from the one or more cell sites, a particular instance of a mobile application on the particular mobile device activates. The mobile application is associated with the communications system 200. The activation can include displaying an application window to the user and/or initiating performing operations by the mobile application. The operations can include, for example, generating the request message.

At 306, the particular instance of the mobile application on the particular mobile device of the multiple mobile devices (e.g., a respective instance of the mobile application operating on the mobile devices 210 and 212) generates a request message. The request message is generated by the particular instance of the mobile application based on the alert message received by the particular mobile device. The particular instance of the mobile application then sends the request to the server subsystem which forwards the request to the lookup subsystem.

In some implementations, the operations performed by the mobile application include determining, or obtaining, the location of the particular mobile device. In some implementations, the location is determined in accordance with the GPS coordinates of the mobile device. For example, the mobile devices 210 and 212 include technology for GPS tracking (e.g., GPS tracker 419 of the computer system 400 in FIG. 4). The tracking can be done automatically and periodically when the respective mobile device is turned on (e.g., powered). In some implementations, the mobile application on the particular mobile device estimates the location of the particular mobile device by periodically storing information about geocode boundaries that are near the particular mobile device. For example, when the mobile device is within a predefined distance from a geocode boundary, within an area defined by a geocode boundary, or in communication with a particular cell site associated with a geocode boundary, the mobile application of the particular mobile device stores the location of the geocode boundary with a time stamp. Storing of the location information by the particular mobile device can be automated (e.g., be done periodically or automatically in response to detecting that the particular mobile device is near a geocode boundary) or could be triggered by an alert message (e.g., an alert message including a digital token). The geocode boundary can include, for example, a country border, a state border, a county border, or a city border. Other examples of the geocode boundary can include an address associated with a particular location (e.g., a transit center, government building, or a skyscraper), or a geographical location (e.g., a highway, a water body, or a train line). The mobile device can estimate a relative location of the particular mobile device to the geocode boundaries based on the periodically stored information. Using the periodically stored information for estimation of the location can shorten the time required for estimation of the location of the mobile device. In particular, the periodically stored information can be used when estimating a location of a moving mobile device as the periodically stored information can be used for projecting the movement of the mobile device.

At 308, the lookup subsystem (e.g., a second subsystem) of the telecommunications system receives the request message generated by the particular instance of the mobile application on the particular mobile device of the multiple mobile devices. At 310, in response to receiving the request message, the lookup subsystem performs a lookup at a database (e.g., the database 220 in FIG. 2) for additional information associated with the alert message. The lookup can include searching the database for additional information that is related to the emergency based on the alert message. The database, therefore, includes the additional information in a form that is searchable by the alert message. In some implementations, the additional information is provided to the database by the alert originator system. The additional information can also include information provided by other information providers such as weather information, transportation information, geographical information, and any other information that might be relevant for the emergency.

The additional information identifies the geographic area associated with the emergency. For example, the additional information can provide detailed information about the geographic area associated with the emergency such as names, addresses, or other identifying information related to the area so that this additional information can be presented to a user of the mobile device. The additional information can also include other information related to the emergency. The other information can include information about the expected duration of the emergency, threat level of the emergency, information about individuals involved with the emergency, a type of an emergency, or visual information (e.g., a map or images describing the geographical area associated with the emergency). For example, the additional information can include a symbol, or a mapping to a symbol, that conveys the type of an emergency (e.g., a symbol indicating a fire, a tornado, a hurricane, or an earthquake). The additional information could further include driving directions for avoiding the location associated with the emergency.

In some implementations, the alert message includes a digital token. The digital token can be generated initially by the alert originator system (e.g., the alert originator system 214 in FIG. 2 associated with a local, state, or federal alert originator agency). In such implementations, the request message can include the digital token forwarded from the particular instance of the mobile application on the particular mobile device to the lookup subsystem. In some implementations, the digital token includes a code associated with the emergency. The server subsystem can identify the emergency associated with the digital token based on the code. In response to the request message, at 314, the server subsystem can establish a communications link between the server subsystem and the particular mobile device via the instance of the mobile application. The communications link can enable downloads of the additional information by the particular mobile device based on the identification of the emergency. The communications link can also enable dynamic downloads by the particular mobile device of updates associated with the emergency from the lookup subsystem. In some implementations, the downloads are performed automatically so that a user of the mobile device does not need to initiate the downloads. For example, the download can occur automatically as the communications link is established and periodically after that (e.g., every 10 minutes, every 30 minutes, or once an hour). The automatic updating can increase the safety and convenience of downloading the additional information so that the user does not have to reach for their phone while, for example, operating a vehicle.

Alternatively, the digital token can be generated by the server subsystem based on the alert message received from the alert originator system. For example, an alert originator of the alert originator system 214 communicates the digital token to the telecommunications system 200 directly prior to communicating the alert message to the alert management system or agency (e.g., FEMA) that facilitates the distribution of the alert messages. The alert originator can provide the telecommunications system 200 with information that allows the telecommunications system 200 to correlate the digital token with a particular alert message (e.g., the lookup server system stores the information for correlating the digital token with the particular alert message).

In some implementations, the alert message includes a geocode. In such instances, the request message can include the geocode forwarded from the particular instance of the mobile application on the particular mobile device to the lookup subsystem. In response to the request message, the server subsystem can establish the communications link between the server subsystem and the particular mobile device. The communications link enables dynamic, automatic lookups at the database by the particular mobile device of updates associated with the emergency.

At 316, the server subsystem communicates the additional information to the particular mobile device. At 318, receiving the additional information by the particular mobile device enables the particular instance of the mobile application to perform an action related to the alert message. The action can be performed based on whether the particular mobile device is located within the geographic area associated with the emergency.

In some implementations, the particular instance of the mobile application determines whether the particular mobile device is located within the geographical area associated with the emergency (e.g., whether the mobile devices 210 and 212 are located within the area 218 in FIG. 2). For example, in response to receiving the alert message, the particular instance of the mobile application activates and determines the location of the mobile device (e.g., as described earlier). The determination can be made based on the determined location of the particular mobile device and the additional information received from the lookup subsystem via the communications link. The additional information includes the information that identifies the area associated with the emergency.

In accordance with a determination that the particular mobile device is not located within the geographical area associated with the emergency, the action related to the alert message can include presenting the user a notification indicating that the particular mobile device is not located within the geographic area associated with the emergency. The notification can be provided via a display or a speaker of the mobile device (e.g., a display device 418 or a speaker device 417 of the computer system 400 in FIG. 4). After presenting the alert message, the instance of the mobile application can determine that the mobile device is located outside of the area associated with the emergency (e.g., the alert message was received due to overshooting) or the mobile device has moved away from the area associated with the emergency even though was originally located within that area. The instance of the mobile application then notifies the user that the previously presented alert message is not relevant to the user. In some implementations, the action related to the alert message performed in accordance with the determination that the particular mobile device is not located within the geographical area associated with the emergency can also include forgoing (e.g., blocking) presenting the alert message to the user.

In some implementations, in accordance with a determination that the particular mobile device is located within the emergency, the action related to the alert message includes providing the user an indication that the particular mobile device is within the area associated with the emergency. Such notification can include further guidance and instructions or further details related to the emergency.

In some implementations, the action related to the alert message can include presenting to the user of the particular mobile device a map indicating the location of the geographic area associated with the emergency and the location of the particular mobile device. The map is presented, for example, on a display of the particular mobile device. In some implementations, the notifications describe earlier can include displaying the map illustrating the location of the mobile device as well as the boundaries of the geographical area associated with the emergency. The map can provide a user with a convenient illustration of the relative locations of the geographical area associated with the emergency and the mobile device. The notifications can also include a text message or a voice message indicating that the mobile device is outside or inside the geographic area associated with the emergency. The notifications can also include a link to a website associated with the alert originator and/or the telecommunications systems. The website can be configured to provide information and updates regarding the emergency.

In some implementations, performing the action related to the alert message includes dynamically displaying updated notifications to the user. For example, the map illustrating the location of the mobile device as well as the boundaries of the geographical area associated with the emergency can be updated based on the movement of the mobile device and/or changes in the boundaries of the area associated with the emergency. The updated notifications can also include other relevant information such as updated information regarding weather, a threat level, movements of a suspect, and/or traffic and transportation. Furthermore, the updated notifications can include a notification indicating that the emergency has passed. Such dynamically updated information can assist the user of the mobile device to stay informed about the progress of the emergency.

In some implementations, in accordance with a determination that the particular mobile device is located outside of the geographical area associated with the emergency (e.g., the mobile device received an overshooting alert message), performing the action related to the alert message includes blocking presentation of the alert message to the user of the particular mobile device to compensate for the overshooting of the alert message. For example, upon a determination that the mobile device 212 is located outside the geographical area 218 in FIG. 2, the instance of the mobile application operating on the mobile device 212 does not present the alert message to the user.

Computer System

Figure 4:
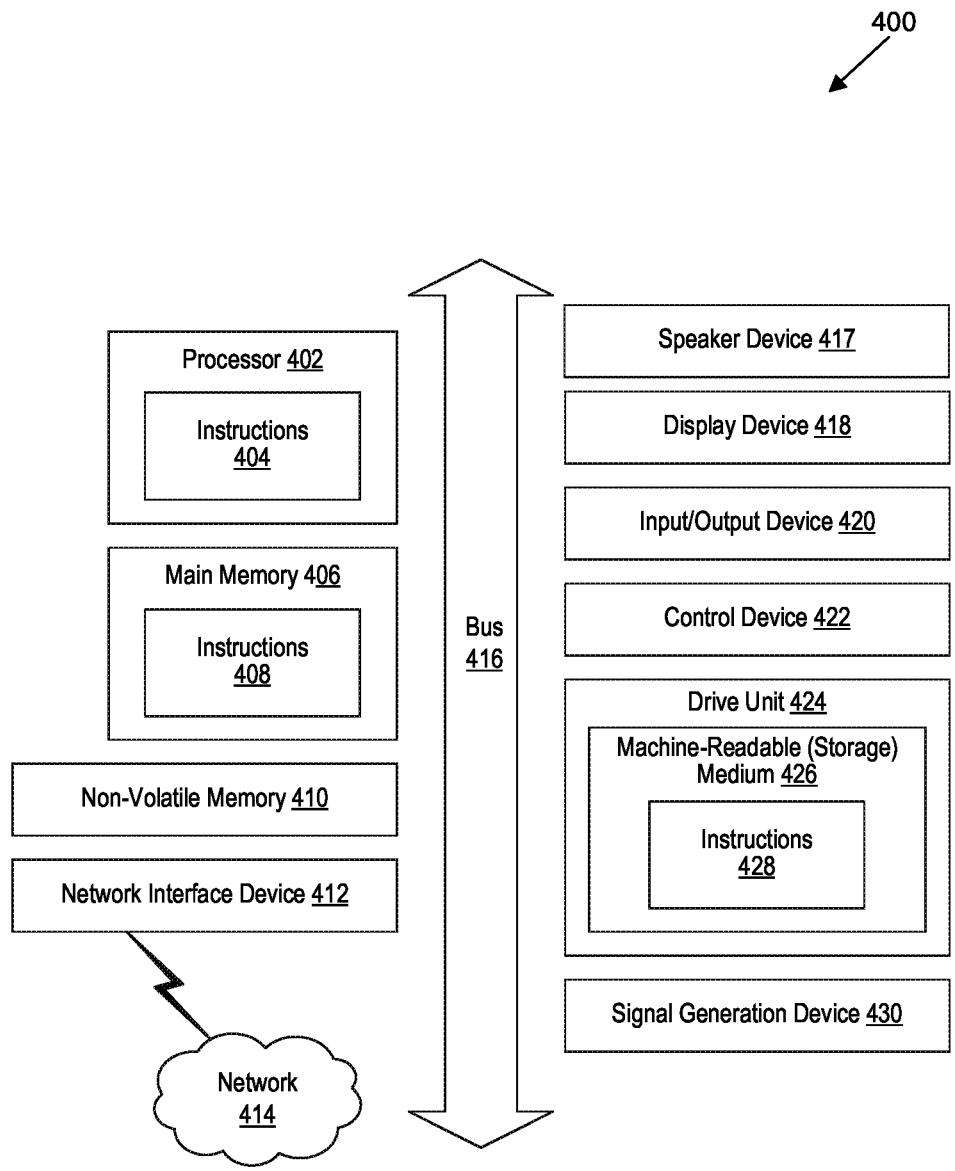
FIG. 4 is a block diagram that illustrates an example of a computer system in which at least some operations described herein can be implemented.

FIG. 4 is a block diagram that illustrates an example of a computer system 400 in which at least some operations described herein can be implemented. As shown, the computer system 400 can include: one or more processors 402, main memory 406, non-volatile memory 410, a network interface device 412, a speaker device 417, a display device 418, a GPS tracker 419, an input/output device 420, a control device 422 (e.g., keyboard and pointing device), a drive unit 424 that includes a storage medium 426, and a signal generation device 430 that are communicatively connected to a bus 416. The bus 416 represents one or more physical buses and/or point-to-point connections that are connected by appropriate bridges, adapters, or controllers. Various common components (e.g., cache memory) are omitted from FIG. 4 for brevity. Instead, the computer system 400 is intended to illustrate a hardware device on which components illustrated or described relative to the examples of the figures and any other components described in this specification can be implemented.

The computer system 400 can take any suitable physical form. For example, the computer system 400 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 400. In some implementation, the computer system 400 can be an embedded computer system, a system-on-chip (SOC), a single-board computer system (SBC) or a distributed system such as a mesh of computer systems or include one or more cloud components in one or more networks. Where appropriate, one or more computer systems 400 can perform operations in real-time, near real-time, or in batch mode.

The network interface device 412 enables the computer system 400 to mediate data in a network 414 with an entity that is external to the computer system 400 through any communication protocol supported by the computer system 400 and the external entity. Examples of the network interface device 412 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 406, non-volatile memory 410, machine-readable medium 426) can be local, remote, or distributed. Although shown as a single medium, the machine-readable medium 426 can include multiple media (e.g., a centralized/distributed database and/or associated caches and servers) that store one or more sets of instructions 428. The machine-readable (storage) medium 426 can include any medium that is capable of storing, encoding, or carrying a set of instructions for execution by the computer system 400. The machine-readable medium 426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 404, 408, 428) set at various times in various memory and storage devices in computing device(s). When read and executed by the processor 402, the instruction(s) cause the computer system 400 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

I claim:

1. A computer-implemented method performed by a telecommunications system for providing targeted alerts to subscribers of a wireless telecommunications network, the method comprising:
   receiving, by a server subsystem of the telecommunications system, an alert message from an alert originator system,
      wherein the alert message indicates an emergency associated with a geographic area,
      wherein the alert message is configured to designate one or more cell sites of the wireless telecommunications network to receive the alert message;
   causing the one or more cell sites to pass the alert message to multiple mobile devices located within a network coverage area of the one or more cell sites,
      wherein the network coverage area includes the geographical area associated with the emergency;
   receiving, at a lookup subsystem of the telecommunications system, a request message generated by a particular instance of a mobile application on a particular mobile device of the multiple mobile devices,
      wherein the request message is generated by the particular instance of the mobile application based on the alert message received by the particular mobile device;
   causing the mobile application on the particular mobile device to estimate the location of the particular mobile device by:
      causing the mobile application on the particular mobile device to periodically store information about geocode boundaries that are near the particular mobile device; and
      causing the mobile application on the particular mobile device to estimate a relative location of the particular mobile device to the geocode boundaries based on the periodically stored information;
   in response to receiving the request message, performing, by the lookup subsystem, a lookup at a database for additional information associated with the alert message,
      wherein the additional information identifies the geographic area associated with the emergency; and
   communicating the additional information to the particular mobile device thereby enabling the instance of the mobile application to perform an action related to the alert message of the particular mobile device based on whether the particular mobile device is located within the geographic area associated with the emergency.

2. The method of claim 1, wherein the alert message includes a digital token and the request message includes the digital token forwarded from the particular instance of the mobile application on the particular mobile device to the lookup subsystem, the method further comprising:
   in response to the request message, establishing a communications link between the server subsystem and the particular mobile device via the instance of the mobile application,
      wherein the communications link enables dynamic downloads by the particular mobile device of updates associated with the emergency, and
      wherein the updates are obtained from the lookup subsystem.

3. The method of claim 1, wherein:
   the alert message includes a digital token;
   the digital token includes a code associated with the emergency; and
   the method further comprises:
      in response to the request message, establishing a communications link between the server subsystem and the particular mobile device via the instance of the mobile application,
      identifying, by the server subsystem, the emergency associated with the digital token based on the code, and
      enabling, by the server subsystem via the communications link, downloading of the additional information by the particular mobile device based on the identification of the emergency.

4. The method of claim 1, wherein the alert message includes a geocode and the request message includes the geocode forwarded from the particular instance of the mobile application on the particular mobile device to the lookup subsystem, the method further comprising:
   in response to the request message, establishing a communications link between the server subsystem and the particular mobile device via the instance of the mobile application,
      wherein the communications link enables dynamic, automatic lookups at the database by the particular mobile device of updates associated with the emergency.

5. The method of claim 1 further comprising:
   causing the particular instance of the mobile application to present to a user of the particular mobile device, on a display of the particular mobile device, a map indicating the location of the geographic area associated with the emergency and the location of the particular mobile device.

6. The method of claim 1 further comprising:
in response to passing of the alert message by the one or more cell sites, causing the particular instance of the mobile application on the particular mobile device to activate.

7. The method of claim 1 further comprising:
causing the particular instance of the mobile application on the particular mobile device to determine whether the particular mobile device is located within the geographical area associated with the emergency,
wherein in accordance with a determination that the particular mobile device is not located within the geographical area associated with the emergency, the action related to the alert message of the particular mobile device includes presenting a notification indicating that the particular mobile device is not located within the geographic area associated with the emergency.

8. The method of claim 1, wherein:
the network coverage area of the one or more cell sites is larger than the geographical area associated with the emergency;
passing the alert message to the multiple mobile devices located within the network coverage area of the one or more cell sites causes overshooting of the alert message to one or more mobile devices located outside the geographical area associated with the emergency and within the network coverage area of the one or more cell sites; and
when the particular mobile device is located outside of the geographical area associated with the emergency, performing the action related to the alert message of the particular mobile device includes blocking presentation of the alert message to a user of the particular mobile device to compensate for the overshooting of the alert message.

9. The method of claim 1, wherein:
the alert message does not include global coordinates defining the geographical area associated with the emergency.

10. The method of claim 1, wherein:
the geographic area associated with the emergency is defined as a state, a county, a city, or a polygonal region defined by the alert originator system.

11. A mobile device in communication with a telecommunications system, the mobile device comprising:
at least one hardware processor; and
at least one non-transitory memory storing instructions for providing targeted alerts to a user, the instructions, which, when executed by the at least one hardware processor, cause the mobile device to:
receive an alert message from a server subsystem of the telecommunications system, via one or more cell sites of the telecommunication systems,
wherein:
the alert message indicates an emergency associated with a geographic area, the alert message designates the one or more cell sites associated with the telecommunications system to pass the alert message to multiple mobile devices located within a network coverage area of the one or more cell sites, and
the network coverage area includes the geographical area associated with the emergency;
generate a request message based on the alert message received by the mobile device;
transmit the request message to a lookup subsystem of the telecommunications system;
estimate the location of the mobile device by:
periodically storing information about geocode boundaries that are near the mobile device; and
estimating a relative location of the mobile device to the geocode boundaries based on the periodically stored information;
in response to the transmitted request message, receive additional information from a lookup subsystem of the telecommunications network,
wherein the lookup subsystem performs a lookup at a database for the additional information associated with the alert message, and
wherein the additional information identifies the geographic area associated with the emergency; and
perform an action related to the alert message based on whether the mobile device is located within the geographic area associated with the emergency from the lookup subsystem.

12. The mobile device of claim 11, wherein: the alert message includes a digital token and the request message includes the digital token forwarded by the mobile device to the lookup subsystem; the server subsystem is caused to, in response to the request message, establish a communications link between the server subsystem and the mobile device; and the mobile device is further caused to dynamically download updates associated with the emergency.

13. The mobile device of claim 11, wherein the mobile device is further caused to: present to the user of the mobile device, on a display of the mobile device, a map indicating the location of the geographic area associated with the emergency and the location of the mobile device.

14. A method performed by a mobile device in communication with a telecommunications system, the method including:
receiving an alert message from a first subsystem of the telecommunication systems, wherein:
the alert message indicates an occurrence associated with a geographic area,
the alert message designates one or more cell sites associated with the telecommunications system to pass the alert message to multiple mobile devices located within a network coverage area of the one or more cell sites, and
the network coverage area includes the geographical area;
transmitting a request message to a second subsystem of the telecommunications system to obtain additional information associated with the alert message from a database;
estimating the location of the mobile device by:
periodically storing information about geocode boundaries that are near the mobile device; and
estimating a relative location of the mobile device to the geocode boundaries based on the periodically stored information;
receiving the additional information from the second subsystem of the telecommunications system; and
performing an action related to the alert message based on whether the mobile device is located within the geographic area associated with the occurrence.

15. The method of claim 14, wherein: the additional information received from the second subsystem identifies the geographic area associated with the occurrence.

16. The method of claim 14, wherein: the alert message includes a digital token and the request message includes the digital token transmitted from the mobile device to the second subsystem; the first subsystem is caused to, in response to the request message, establish a communications link between the first subsystem and the mobile device; and the method further includes dynamically downloading updates associated with the occurrence.

17. The method of claim 14 further comprising: presenting to a user of the mobile device, on a display of the mobile device, a map indicating the location of the geographic area associated with the occurrence and the location of the mobile device.

\* \* \* \* \*